United States Patent Office 2,826,512
Patented Mar. 11, 1958

2,826,512

METHOD OF COATING AND RESULTING PRODUCT

Carl A. M. Rex, Hoboken, N. J., assignor of one-half to Jack F. Govan and one-half to Roy H. Govan, both of Hoboken, N. J.

No Drawing. Application August 14, 1953
Serial No. 374,439

12 Claims. (Cl. 117—70)

The present invention relates to a process for the coating of metals and other materials and the resulting products, and more particularly to a process for the preparation and coating of metal surfaces or the like to protect such surfaces when exposed to heat, oxidizing conditions, corrosive vapors, mechanical erosion, and the like.

Prior to the instant invention, many processes and coating materials have been proposed for use in protecting metallic surfaces. However, it has been found that the articles containing these coatings have been unsatisfactory in one or more of the following respects. At high temperatures, the coatings have been found to decompose and burn and thus lose all of their protective characteristics. The enamel and ceramic glazes, due to the methods of application used, have been found incapable of withstanding severe thermal and percussive shock. Such coatings have been found to be incapable of adhering well to the base metal during usage. None of the coatings nor processes of coating previously proposed has been found capable of being applied to metals and other surfaces of material having widely different expansion coefficients such as iron, steel, aluminum, copper, stainless steel, tungsten, molybdenum, magnesium, titanium, and the like, and which will adhere to such a variety of surfaces when thermal shock is imparted to the coating, such as by heating followed by sudden cooling. In such cases, the differences in the expansion of the metals and the coating occurs so suddenly as to set up enormous stresses and strains which dislodge the coatings. Further, the coatings as previously applied will not withstand flexing, bending, forming, swaging, or drawing of the coated surface without dislodging the coating.

In present day design of jet engines and the like, difficulty has been experienced in obtaining materials suitable for use in the nozzle end where temperatures of about 3000° F. must be withstood, while in contact with highly corrosive gases. Most of the usual heat-resistant alloys begin to melt when heated within the temperature range of 2400° F. to 2600° F. Of the metals having melting points greatly exceeding this temperature range, only such scarce metals as Pt and iridium melting at 3180° and 4260° F., respectively, have sufficient resistance to oxidation at high temperatures to be used without protection. The high cost and short supply of these metals prohibit their use for large scale production.

Other metals that have high melting points but do not have good oxidation resistance include:

| | ° F. |
|---|---|
| Titanium | 3270 |
| Thorium | 3350 |
| Zirconium | 3450 |
| Boron | 4150 |
| Molybdenum | 4750 |
| Tantalum | 5160 |
| Tungsten | 6100 |

The last three, especially molybdenum, are of special interest from the standpoint of potential applications in very high temperature service.

Molybdenum is commercially available in substantial quantities. The one characteristic of the unprotected metal, which precludes its use in high temperature applications for which its strength and melting point would be adequate, is its poor resistance to oxidation at high temperatures. The present invention relates to preparing and protectively coating molybdenum and other metals so that the rapid disintegration of the molybdenum or other metal in oxidation atmospheres is retarded.

Heretofore, it has been proposed to utilize ceramic coatings on molybdenum, as in the National Advisory Committee for Aeronautics Technical Note No. 1626 (1948). However, the ceramic or vitreous coatings, while as a rule resistant to oxidation and corrosion, especially if selected with due regard for the conditions to be encountered, are possessed of other inherent failings that often preclude or make impossible their use as coatings for other materials even though by themselves they are excellent. For instance, they are fragile, incapable of withstanding sudden changes in temperature, do not bond firmly to the metal or other material being coated, and generally require close adjustment in composition to impart a coefficient of thermal expansion, approximately that of the material being coated. These adjustments in composition frequently mitigate other properties, so that at best the final result is a compromise of properties and there is ever present a struggle to obtain a suitable coating for the particular material to be coated.

In my copending application Serial No. 342,985, filed March 17, 1953, there is described a coating process and the resulting product which is a distinct advance in the prior art in providing a method of coating metals to yield a protectively coated surface that will withstand flexing, bending, forming, swaging or drawing, without dislodging the protective coating; will protect the materials during heat treatment; and will withstand thermal and percussive shock regardless of the differences in coefficients of thermal expansion of the coating and the base. This copending application utilizes powder metallurgy technique for bonding a ceramic coating to the metal, which can best be described as a three-layer coating effect, namely, the base such as metal, a transition area of both metal and ceramic, and an outer coating of ceramic only.

It is now the object of the present invention to improve upon the results obtained in the prior art and my copending application to yield a protectively coated surface that will wtihstand the effects of corrosive gases at higher temperatures and for a longer period of time.

A further object of the present invention is to provide a method of coating metals and other surfaces to yield a protectively coated surface that will withstand flexing, bending, forming, swaging or drawing without dislodging the protective coating so applied.

A still further object of the present invention is to provide a method of protectively coating metals and the like to yield a coating capable of protecting such materials during heat treatment.

A still further object of the present invention is to provide a method of protectively coating metals and the like whereby not only the surface of the material is coated, but wherein a portion of the coating extends to a slight depth beneath the surface, however, the core of the body of material is not affected.

A still further object of the present invention is to provide a method of protectively coating metals and the like whereby the resultant product is capable of withstanding thermal and percussive shock regardless of the differences in coefficients of the coating and the metals coated thereby.

A still further object of the present invention is to provide a method of manufacturing molybdenum articles and protectively coating the articles to withstand the effect of corrosive and oxidizing gases at high temperatures.

Other objects and the nature and advantages of the instant invention will be apparent from the following description wherein, through the use of powder metallurgy techniques or the equivalent, a composite material is formed which consists of a high density core, an intimately bonded protective coating of a vitreous or ceramic material and metal which extends to a slight depth beneath the surface of the material and, if desired, additionally a coating of metal and, if further desired, a final ceramic coat.

The present coating method results in a product that is different from that obtained in the copending application previously referred to. The previous method resulted in a product wherein the base metal and outer continuous vitreous coating were separated by an intimately bonded transition layer of ceramic and metal.

According to the present invention, the transition layer does not proceed to a metal-free ceramic layer. This coating can be best described as a three-layer effect, that is, a densified core of metal, a transition layer of ceramic and metal varying gradually from high metal-low ceramic content to an outer layer of lower metal-higher ceramic content, and finally over-coated with a metal layer. Following the first coating step, there is a perceptible amount of metal in the outer layer. The reason for maintaining the metal in this outer layer is due to the difficulty of adhering of the outer metal coating to a purely ceramic layer. By maintaining a perceptible amount of metal in the outer surface of the first step of the coating process, a firmly adhering outer coating of metal may be obtained in which the outer metal adheres to the metal in the metal-ceramic surface to which it is bonded. Maintaining a perceptible amount of metal in this outer ceramic-metal layer imparts electrical conductivity to it, so that the metal layer may be deposited thereon by electroplating, if desired, whereas this could not be done on a metal-free ceramic layer. Recourse to electroplating this metal layer is not essential, however, since the metal may be deposited by other methods, such as spray application, chromatizing, displacement plating, vacuum deposition, sintering and other commonly used methods.

Still another advantage of the metal in the outer ceramic-metal layer is that this interface provides numerous gripping or bonding points to which the continuous metal layer to be applied can more tenaciously adhere. This ceramic-metal layer interposed between the metal core and the metal over-coat acts as a transition area for thermal shock absorption.

For certain usages, the metal core, ceramic-metal layer and metal over-coat render the article serviceable without further treatment. In other instances, an outer ceramic coating is required.

There is thus effected a four-layer effect which can best be described as:

(1) The base material to be protected
(2) The transition area of ceramic-metal
(3) The metal over-coat
(4) The final ceramic coat The method of procedure and the function of the various layers will now be described.

The base metal is that material that is to be protected under the service conditions demanded. This method is particularly adapted to metals which have good heat service characteristics, such as a high melting point, but which are very susceptible to oxidation, corrosion attack and deterioration, especially at high temperatures. The method may be applied to such base metals as iron, chromium, nickel, copper, aluminum, silver, tin, zinc, molybdenum, tungsten, magnesium, titanium, and alloys of these metals, such as stainless steel, etc.

The metal to be protected may be obtained in the form of finely divided metallic powder and placed under suitable pressure to cause the powder to cohere into a porous body of relatively low density.

The more conventional methods of powder making involve the crushing and grinding of metal ingots or the like to substantially minute or microscopic powder particles. Metal powders are also made by reducing the purified oxide of the metals in a correct atmosphere, such as hydrogen or hydrogen and nitrogen. The deposition of pulverulent metal directly in an electrolytic tank offers an excellent source of powder.

The metal powders may be compressed either as an individual metal, as a mixture of two or more metals, or as powdered alloys. The initial compression is effected cold at a pressure adequate to form the powder into a coherent body of desired density so that it is in condition for the subsequent treatment. It has been found that a pressure of from 12½ to 80 tons is satisfactory, with a pressure of about 25–50 tons generally used. The powders may be compacted into the shape of a briquette or wafer, or directly in a mold to yield any desired shape. This is termed the preform.

As an alternative method, the present invention contemplates the coating of a base metal that is already available in sheet, rod or shaped form. The surfaces of the metal may be made sufficiently porous by a sandblasting operation; by successive exposure to an oxidizing and then a reducing atmosphere; acid etching; or any other suitable mechanical or chemical means to produce a high degree of surface porosity on the article which simulates the surface porosity found in the metal powder briquettes.

A particularly effective method of operation starting with sheet or rod stock is to first treat the base metal through a sintering process, wherein a coating of the same metal is applied to the base metal, either by dusting or spraying, and thereafter firing to a temperature wherein the coating sinters to the base metal. This results in an extremely porous metal surface suitable for the subsequent coating process.

Before applying the first coating material to the porous surface, it may be found necessary to control the amount of absorption of this coating material into the porous surface by applying a sizing coat to partly seal the pores. A gum solution, such as gum arabic, may be used for this purpose. The strength of the gum solution and the medium used are subject to wide variation, depending upon the metal being coated, the particle size used, the nature of the metal, extent of mechanical compression, agglomeration, and so on. After dipping in the gum solution, the preformed metal is air-dried, whereupon it is ready for application of the next coat or transition layer.

The application of the transition layer may be accomplished by various means. One method that can be used is to apply a ceramic or vitreous coating composition to the outer surface of the porous metal. The consistency and composition of this ceramic layer, as well as the pore size of the metal surface, are controlled so that the ceramic coating composition penetrates into the undensified preform so that the outer layer, instead of being entirely ceramic, is a mixture of ceramic and metal.

A second method is to apply a ceramic-metal combination or mixture. Such compositions are termed ceramet, ceramal, ceramel, etc. It is to be understood that when a ceramic-metal coating is referred to herein, any of these compositions can be utilized.

A third method is a combination of these two, namely, to apply a ceramic coating composition first, followed by a ceramic-metal composition thereon.

The porous preform may be coated with the coating composition by any of the known methods, such as dipping, spraying, brushing, soaking, wiping or flooding. The coating material is then allowed to dry. The coating and drying steps can be accomplished at room temperature or at elevated temperatures as desired. Due to the porous nature of the body being coated, the coating material will penetrate to a depth slightly below the surface into the porous mass, however, it will be confined mainly near the surface where the protection is desired and will not penetrate to such a depth where it will affect the core of the metal.

In the application of the material to the surface to be coated, it is preferable that water be used to effect solution of the soluble ingredients and suspension of the insoluble ingredients, using sufficient liquid to form a slurry having the consistency of paint.

The coated briquette or body is heated in an inert atmosphere to a temperature approximating the normal forging temperature for the metal in question. The heating may be accomplished in a furnace. The time and temperature of heating are carefully regulated for the particular metal and coating, after which the heated and coated briquette or body is densified. The densification can be accomplished by mechanical working such as by forging, rolling or hot pressing. During the densification, a certain amount of the coating is forced by pressure and the flow and movement of the particles to penetrate beneath the outer surface of the metal, thus establishing a mechanical bond between the metal and the coating, and it is further believed that a partial chemical or physicochemical bond of the metal and the coating material is formed in this area, thus increasing the bonding tendency and introducing an area of transition from pure metal on one side to coating material on the other.

It is believed that the coating material as well as the metal becomes fused or plastic under the influence of the pressure at the temperature and pressure utilized during the heating and densifying steps, and upon release of pressure and cooling will solidify. At the elevated temperature, and when struck with the force necessary to densify the metal, both are brought into intimate contact with and are worked into each other to a slight depth at the interface.

The coated metal is allowed to cool and is then thoroughly cleaned to remove any loosely adhering particles. The coating procedure, heating in an inert atmosphere, forging and cleaning may be repeated several times as necessary to obtain the desired results.

Although the intermediate transition layer is greatly protective in itself, under extreme and prolonged conditions of service, the metal to be protected is benefited by an outer metal coating. The transition layer presents an ideal media for such metal application. The marked difference between the coefficient of expansion of the metals and ceramic-metal composition in the transition area is rendered less abrupt by the gradual change in composition. It can be considered a thermal and mechanical shock absorbing area. The ceramic content acts as a bar to diffusion of corrosive and oxidizing gases while the metal content presents an anchoring point for the metal consitituting the third layer.

The metal coated with ceramic-metal is thoroughly cleaned, as by sand-blasting with fine sweet Alundum, after which the outer metal layer is applied.

The metal over-coating may be any metal which, for the service contemplated, is deemed suitable, and may, of course, be the same as or different from the core metal, or may be an alloy of two or more metals. Chromium, nickel, stainless steel and Nichrome (60% Ni, 15% chrome, 25% iron) have all been used to good effect. As stated heretofore, any method of applying the metal may be used, but electroplating or spray application is particularly advantageous. Any technique of application that insures a continuous coating with lack of porosity is preferable. The final protection afforded by this layer is dependent upon the lack of discontinuity vertically through this layer, which in turn governs the thickness of coating and similar variables. Even imperfect coatings effect a degree of protection but the more perfect the coating and its continuity, the more perfect is the resulting protection. A metal coating of approximately 0.010" to 0.015" has been found satisfactory.

At points where the outer metal coating contacts the metal of the ceramic-metal layer, slight sintering or perhaps alloying may occur to strengthen the bond, but the extent of the alloying that normally occurs with two metals in contact at high temperatures is retarded by the ceramic content of the ceramic-metal layer. Little, if any, absorption of the protecting metal into the core takes place. This transition from the ceramic-metal layer to the outer metal layer is abrupt, and unlike the gradual transition layer heretofore discussed.

The metal coated specimen may then be heated preferably in a reducing atmosphere at the forging temperature of the metal for a day and allowed to cool. It can then be reheated and further densified.

After cooling, a final ceramic coat can be applied, as by forming a slurry, dipping, drying and heating in air to vitrify. The outer ceramic coating utilized is preferably of the composition described in my copending application Serial No. 205,035, filed January 8, 1951, now Patent No. 2,658,834, issued November 10, 1953.

When the over-coat of metal is properly selected for suitability to additional coating with an outer pure ceramic coating, the desirable protective action characteristic of the ceramic over-coating is obtained, such as resistance to oxidizing and corrosive atmospheres. The glazed coating effectively reduces, retards and even eliminates the diffusion of the gases into the body where they can attack the metal. This outer coating imparts a smoothness, air slip, friction reduction and other properties characteristic of ceramics.

The entire coating process described presents a series of barriers, each different in function and purpose, so that better protection is obtained than by the use of a lesser number of the individual coatings even though having the same total thickness.

It is obvious that the coating steps described can be repeated in innumerable combinations with out departing from the basic scope of the invention.

The following specific example is illustrative of the practice of this invention, but is not intended to limit the same:

Molybdenum powder of an average particle size of 1 micron was compressed into a loosely adhering rectangular shape which will be called the preform. This was accomplished by placing the powder in a die of suitable shape and applying a pressure of approximately 25 tons per square inch to agglomerate the particles so that the formed article will hold its shape for subsequent handling. In this condition, the preform had very little strength; was porous, easily crushed by force, and easily disintegrated by abrasion. If the preform had a densely packed surface due to contact with the die, the preform could be lightly sanded. The density of the molybdenum preform at this point was approximately 63% of the solid density of moylbdenum. The preform size was 0.375" x 0.375" x 2.258" long.

The preform was next dipped in a 2% aqueous solution of gum arabic, removed and dried.

A ceramic-metal mixture consisting by weight of ⅔ electrolytic chromium powder of 325 mesh and ⅓ ceramic powder was mixed with water to produce a good suspension. The preform was dipped into this and dried under heat.

The ceramic powder used is preferably a combination of powdered glass, clays, and oxides. The composition of the clays, glasses and oxides can be varied as well as the proportions used and their grain size. A specific example of a ceramic powder found especially suitable is:

| | Percent |
|---|---|
| Powdered glass | 15–20 |
| Kaolin | 15–20 |
| Felspar | 10–20 |
| Flintmeal | 20–30 |
| Alumina | 5–15 |
| Whiting | 10–20 |

The coated preform was heated to 2400° F. in an atmosphere of hydrogen for fifteen minutes in order to heat it uniformly to the core. When thoroughly heated, it was forged by one blow with a force fall hammer of 200 pounds through an 18" drop. The specimen was then allowed to cool and was thoroughly cleaned with a wire brush to remove any loosely adhering particles.

The coating with the ceramic-metal mixture, heating in the hydrogen atmosphere, forging and cleaning steps, were repeated three additional times, but between each blow of the forge the specimen was rotated 90° from the position of the previous blow.

At this point, the specimen, including its component of ceramic material, had an average density of 9.15 gm./cc. as compared to that of 10.2 gm./cc. for densified pure molybdenum.

The specimen was thoroughly cleaned by a light sandblasting with fine Alundum, and then a coating of Nichrome was applied to all surfaces by metal spray gun technique to a thickness of about 10 mils. It was then heated in a hydrogen atmosphere for twenty-four hours at 2400° F. and allowed to cool.

The purpose of this heating was primarily to reduce the porosity of the sprayed metal coating by sintering the Nichrome coating. This treatment further served the purpose of establishing sinter bonds between the chromium in the metal-ceramic coating and in the Nichrome coating, and also served to reduce any reduceable oxide formed in the spraying on of the Nichrome coating.

The surface presented by the sprayed metal was still somewhat rough and porous. To further densify and give a smooth non-porous surface to the sprayed metal layer, the specimen was dip-coated in a ceramic coating similar in composition to that disclosed in applicant's copending application Serial No. 205,035, filed January 8, 1951. It was then heated for fifteen minutes in dry hydrogen at 2400° F. and forged one blow. The surface resulting from this operation was very smooth and the metallic appearance lost.

Another dip-coat of the ceramic material and subsequent firing for fifteen minutes at 2100° F. in hydrogen produced a deep black smooth surface having a glassy appearance. A third final dip-coat of the ceramic material was applied and dried.

In an air atmosphere at 1650° F. unprotected .040" molybdenum sheet was found to decrease to one-half of its original thickness in ½ hour.

A specimen made in accordance with the above example was heated in a quartz tube at 2000° F. under an air flow of 30 cu. feet per hour for 100 hours without any visible breakdown or deterioration due to oxidation. Repeated additional heating to 2000° F. in air followed by an air quench at room temperature totaling as many as five in number was made without any visible deterioration. Further oxidation tests at 2000° F. under air flow for an additional one-hundred and fifty hours were conducted. The specimen had the same appearance and measurements showing that no oxidation had occurred. It should be noted that a heating and forging step after the spray metal coated article has been heat-soaked can be inserted, and the heating and forging step after the first outer ceramic coating can be eliminated.

It is the present practice in the fabrication of molybdenum rod and wire to take a slightly compressed preform of molybdenum and connect the ends with an electric current source. Utilizing the electrical resistance of the metal, the metal is heated to within 5% of its melting point in a vacuum or reducing atmosphere until sintering and agglomeration of the metal occurs.

This is an expensive process of fabricating densified molybdenum as compared to the present invention, wherein a dense molybdenum product is formed without recourse to the high heat and expensive heat source of electricity. The forging, or hot coining, process described herein in fabricating coated articles, presents these and numerous other advantages over present methods for fabricating high density shaped parts from molybdenum powder, or other metal powders, such as tungsten, titanium, cobalt and chromium metals and alloys. This method is particularly practical where the coating or coatings utilized do not interfere with the final use of the metal and affords a great deal of protection.

However, even where such coating or coatings are objectionable, the same method can be employed followed by removing the coating or coatings by any suitable means, such as machining, grinding, chemical solution, or the like. In this way, the protection afforded by the coating during processing and heat treatment can be utilized and thereafter removed.

The field of application of this coating process is extremely varied and diverse and includes such applications as coatings for heat treating metal wire, plates, castings, etc., coatings for jet engine exhausts, coatings for metals during welding or brazing, coatings for exhaust manifolds, coatings for casting molds and many other uses where especially high temperatures, chemical corrosion, or mechanical erosion are to be encountered.

It will be obvious to those skilled in the art that various changes may be made without departing from the spirit of the invention and, therefore, the invention is not limited to what is described in the specification, but only as indicated in the appended claims.

What is claimed is:

1. A protectively coated metal article obtained by densifying a porous metal article having a coating thereon, said metal being selected from the group consisting of iron, chromium, nickel, copper, aluminum, silver, tin, zinc, molybdenum, tungsten, magnesium, titanium, and stainless steel, the coating consisting of a dried vitreous coating composition consisting of a mixture of one part of a powdered ceramic material and two parts of powdered chromium, said ceramic material being a mixture of powdered glass, clay and oxides, said densifying being accomplished by hot forging the coated article while the temperature thereof is maintained at approximately the normal forging temperature of said base metal.

2. A protectively coated article in accordance with claim 1, wherein said article contains a coating of metal deposited thereon, said coating metal being selected from the group consisting of chromium, nickel, stainless steel and Nichrome.

3. A protectively coated article in accordance with claim 2, wherein said article contains an outer coating of vitrified ceramic material thereon, said ceramic material essentially containing sodium metaborate as an ingredient therein.

4. A protectively coated molybdenum article obtained by densifying a coated porous molybdenum surface, the coating consisting of a dried vitreous coating composition consisting of one part of a powdered ceramic material and two parts of powdered chromium, said ceramic material being a mixture of powdered glass, clay and oxides, said densifying being accomplished by hot forging at a temperature of approximately 2400° F.

5. A protectively coated molybdenum article in accordance with claim 4 wherein said article contains an outer coating of a metal deposited thereon, said coating metal being selected from the group consisting of chromium, nickel, stainless steel and Nichrome.

6. A protectively coated molybdenum article in accordance with claim 5, wherein said article contains an outer coating of a vitrified ceramic material thereon, said ceramic material essentially containing sodium metaborate as an ingredient therein.

7. The method of protecting a metal surface from oxidation at elevated temperatures which comprises preparing a porous metal surface, said metal being selected from the group consisting of iron, chromium, nickel, copper, aluminum, silver, tin, zinc, molybdenum, tungsten, magnesium, titanium, and stainless steel, coating said porous metal surface with a coating composition consisting of a suspension in water of a mixture of one part of powdered ceramic material and two parts powdered chromium, said ceramic material being a mixture of powdered glass, clay and oxides, drying said coating, hot forging said coated porous metal article while the temperature thereof is maintained at approximately the normal forging temperature of said base metal.

8. A method in accordance with claim 7, wherein the porous metal surface is obtained by cold pressing the metal in powdered form into a porous preform.

9. A method in accordance with claim 7, including the step of depositing a further coating of metal thereon, said coating metal being selected from the group consisting of chromium, nickel, stainless steel, and Nichrome.

10. A method in accordance with claim 9, wherein the base metal is molybdenum and the metal in said outer coating is Nichrome.

11. A method in accordance with claim 9, including the additional steps of coating the product resulting therefrom with a ceramic material, and vitrifying said ceramic material, said ceramic material essentially containing sodium metaborate as an ingredient therein.

12. A method in accordance with claim 10, including the additional steps of coating the product resulting therefrom with a ceramic material, and vitrifying said ceramic material, said ceramic material essentially containing sodium metaborate as an ingredient therein.

References Cited in the file of this patent

UNITED STATES PATENTS

| | | |
|---|---|---|
| 2,251,410 | Koehring | Aug. 5, 1941 |
| 2,294,756 | Inutsuka et al. | Sept. 1, 1942 |
| 2,431,660 | Gaudenzi | Nov. 25, 1947 |
| 2,671,955 | Grubel | Mar. 16, 1954 |
| 2,698,990 | Conant et al. | Jan. 11, 1955 |

FOREIGN PATENTS

| | | |
|---|---|---|
| 656,503 | Great Britain | Aug. 22, 1951 |